June 28, 1927.
C. A. JOHNSON
1,633,943
MOTOR STARTING SYSTEM
Filed June 3, 1920
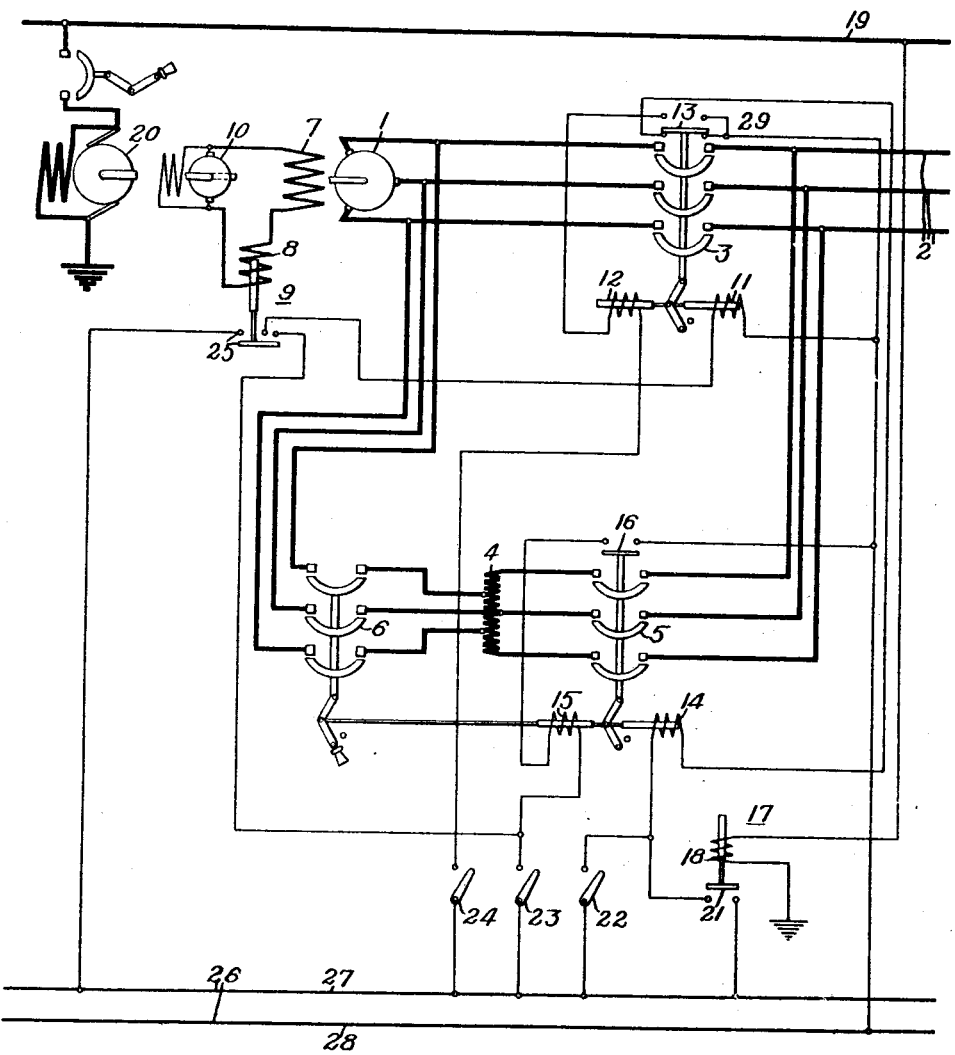
WITNESSES:
INVENTOR
Clarence A. Johnson
BY
ATTORNEY Patented June 28, 1927.

1,633,943

UNITED STATES PATENT OFFICE.

CLARENCE A. JOHNSON, OF LARIMER, PENNSYLVANIA, ASSIGNOR TO WESTINGHOUSE ELECTRIC & MANUFACTURING COMPANY, A CORPORATION OF PENNSYLVANIA.

MOTOR-STARTING SYSTEM.

Application filed June 3, 1920. Serial No. 386,222.

My invention relates to motor-starting systems and particularly to systems for starting synchronous motors.

One object of my invention is to provide means for starting the motor of a synchronous motor-generator set in an automatic substation.

Another object of my invention is to provide a synchronous motor-starting system wherein the actuation of the running circuit interrupter is controlled by predetermined conditions in the field-magnet windings.

Another object of my invention is to provide a system of the above-indicated character that shall have means for precluding connection of a synchronous motor directly to a source of electromotive force of normal value until the speed of the motor corresponds to the synchronous speed that is determined by the source of electromotive force.

A further object of my invention is to provide a simple system of the above-indicated character that shall be automatic and reliable in its operation.

In starting a synchronous motor, a reduced electromotive force is ordinarily applied to the armature windings to preclude the flow of currents of excessive value therein. The armature windings are energized from the source of reduced electromotive force until the motor attains its synchronous speed and are then disconnected from the source of reduced electromotive force and directly connected to the circuit of normal electromotive force from which they are to be energized. If the armature windings are connected to the circuit before the motor has attained its synchronous speed, excessive currents will be caused to traverse the windings, and heavy surges will be produced in the circuit.

Ordinarily, a synchronous motor has an exciter directly connected thereto for energizing the field-magnet winding of the motor. While the motor is starting, the rotating magnetic fluxes, that are induced by the currents traversing the armature windings of the motor, induce an alternating electromotive force in the field-magnet winding of the motor. Since the field-magnet winding of the motor is directly connected across the terminals of the exciter generator armature, and the voltage of the exciter generator is built up slowly, the field-magnet winding is traversed by relatively small values of direct current until synchronous speed is reached. When the motor attains synchronous speed, the field-magnet winding of the motor is rotating at a speed corresponding to the synchronous speed of the motor and, since there is substantially no relative movement between the rotating field-magnet winding and the magnetic fluxes that traverse the stator of the motor, an alternating electromotive force is no longer induced in the rotating field-magnet winding. As this alternating electromotive force is gradually reduced to zero, the direct-connected exciter builds up and energizes the field-magnet winding by direct current.

In practicing my invention, I provide a relay in the circuit of the field-magnet winding of the motor that is responsive to a predetermined value of direct current only. When the motor attains synchronous speed and the exciter builds up to a predetermined value, the relay becomes energized and serves to complete a circuit to energize means for connecting the armature windings directly to the source of normal electromotive force. The connection of the motor to the circuit is thus made dependent upon the motor actually attaining synchronous speed, since the field-magnet winding will not be sufficiently energized by direct current from the exciter generator until such conditions obtain. Premature connecting of the motor to the circuit is thereby prevented.

In order that the operation of the motor-generator set may be fully automatic, the starting of the motor may be controlled by some means that is responsive to a predetermined condition. A drop in potential of a trolley feeder adjacent to an automatic railway substation may serve to actuate a relay to start the motor-generator set to furnish additional energy to the feeder, a circuit may be completed by a float device at a predetermined low level in a reservoir to energize a relay for starting the motor to operate a pump for refilling the reservoir, or the starting may be controlled by an attendant.

The starting system herein disclosed may thus be employed in various applications where a synchronous motor is employed and may be made automatic by the application of a relay thereto that is responsive to a predetermined condition, upon the occurrence of which the operation of the motor is desired.

The single figure of the accompanying drawing is a diagrammatic view of an electrical system embodying my invention.

A synchronous motor 1 is adapted to receive energy from a source 2 of electromotive force through a circuit interrupter 3. To provide a reduced electromotive force for starting the synchronous motor 1, a plurality of auto-transformers 4 are employed that are connected between the armature windings of the motor and the source of electromotive force 2 by means of two circuit interrupters 5 and 6. The interrupters 5 and 6 are mechanically connected and are simultaneously actuated. The field-magnet winding 7 of the motor 1 is connected in series with a winding 8 of a direct-current relay 9, across the terminals of an exciter generator 10 that is mechanically connected to the motor.

The circuit interrupter 3 is provided with a closing magnet 11, a tripping magnet 12 and an auxiliary pallet switch 13. The starting interrupters 5 and 6 are provided with a closing magnet 14, a tripping magnet 15 and an auxiliary pallet switch 16. A control relay 17 is provided with a winding 18 that is responsive to a predetermined voltage on a trolley feeder conductor 19 which is supplied with energy from a generator 20 that is driven by the synchronous motor 1. A plurality of contact members 21 of the control relay 17 serve to complete a circuit for energizing the closing magnet 14 of the starting interrupters 5 and 6. A manually-operated switch 22 is connected in parallel relation with the contact members 21 of the control relay 17 and serves as a manually-operated means for starting the motor. Two additional manually-operated switches 23 and 24 may be employed for manually tripping the starting and the running interrupters 6 and 3, respectively. The relay 9 is provided with a plurality of contact members 25 that are adapted, upon the energization of the relay, to complete a plurality of circuits for energizing the tripping magnet 15 of the interrupters 5 and 6 and the closing magnet 11 of the interrupter 3 from a source 26 of constant electromotive force.

When the potential of the trolley conductor 19 drops to or below a predetermined value, engagement is effected between the contact members 21 of the relay 17, a circuit is completed thereby from a conductor 27 of the circuit 26 through the winding of the closing magnet 14 of the interrupters 5 and 6 and through the contact members 29 of the pallet switch 13 of the interrupter 3 to the conductor 28 of the circuit 26. The closing magnet 14 is thereupon energized, and the interrupters 5 and 6, being mechanically interlocked, are simultaneously closed. When the interrupters 5 and 6 are closed, an electromotive force is impressed upon the armature windings of the motor 1 that produces a rotating magnetic field which starts the motor. Since the field-magnet winding 7 of the motor 1 is close-circuited through the winding 8 of the relay 9 and the armature windings of the direct-connected exciter generator 10, and, since the exciter voltage builds up slowly, insufficient direct current will traverse the winding 8 to operate the relay 9 until after the motor 1 has accelerated to synchronous speed. Upon the energization of the field-magnet winding 7 by the direct current from the exciter generator 10, the winding 8 of the relay 9 is also energized and, at a predetermined value of current, so actuates the relay 9 as to effect engagement of its contact members 25.

Upon the engagement of the contact members 25 of the relay 9, two circuits are completed, one serving to energize the closing magnet 11 of the running interrupter 3 and the other serving to energize the tripping magnet 15 of the starting interrupters 5 and 6. The armature windings are then directly connected to the conductors of the circuit 2 by means of the interrupter 3 and have the full voltage of the circuit 2 impressed thereupon. Since the motor has already attained its synchronous speed, no serious surges are occasioned by connecting the motor windings to the circuit 2. Since the actuation of the running interrupter 3 is determined by the energization of the relay 9, the actuation of which is dependent upon the motor attaining its synchronous speed in order that the exciter generator may build up to its normal voltage, the motor is safe-guarded from being prematurely connected to the circuit 2.

The auxiliary switch 13 on the running interrupter 3 is employed to provide an electrical interlock that precludes actuation of the interrupters 5 and 6 except when the interrupter 3 is in its open position. The auxiliary switches 13 and 16 are also employed to provide auxiliary means for opening the circuit of the tripping windings of their respective interrupters 3 and 6.

The stopping of the motor may be variously controlled and made dependent upon predetermined conditions in a manner similar to the starting thereof. That is, the demand of energy from the generator, or the level of the water in a reservoir may be used as controlling means for stopping the motor.

I, therefore, do not limit the application of my motor-starting system to an automatic railway or power substation embodying a synchronous motor-generator set nor do I limit my invention to the particular arrangement disclosed, as various modifications may be made therein within the spirit and scope of the invention as set forth in the appended claims.

I claim as my invention:

1. In a system for starting a synchronous motor provided with a direct-connected exciter generator for energizing the field-magnet winding of the motor, the combination with a source of electromotive force and means for connecting the armature windings of the motor thereto, of means responsive to the energization of the motor field-magnet from the generator winding for controlling the connecting means.

2. In a system for starting a synchronous motor providing with a mechanically connected exciter generator for energizing the field-magnet winding of the motor, the combination with a source of electromotive force and means for connecting the armature windings of the motor thereto, of a direct-current relay connected in series circuit with the motor field-magnet winding for controlling the connecting means.

3. In a system for starting a synchronous motor provided with a direct-connected exciter generator normally connected to the field-magnet windings of the motor during the starting period thereof, the combination with a source of electromotive force and means for connecting the armature windings of the motor thereto, of a relay in the circuit of the field-magnet windings for controlling the connecting means.

4. In a system for starting a synchronous motor provided with a direct-connected exciter generator normally connected to excite the field-magnet winding of the motor during the starting period thereof, the combination with a source of electromotive force and means for connecting the armature windings of the motor thereto, of means responsive to a predetermined current condition in the motor field-magnet winding for controlling the connecting means.

5. In a system for starting a synchronous motor provided with a direct-connected exciter generator normally connected to excite the field windings of the motor, the combination with a source of electromotive force and means for connecting the armature windings of the motor thereto, of means responsive to a predetermined value of direct current in the motor field-magnet windings for controlling the connecting means.

6. In a system for starting a synchronous motor provided with a direct-connected exciter generator normally connected to excite the field-magnet winding of the motor, the combination with a source of electromotive force and means for connecting the armature windings of the motor thereto, of means for providing a low starting voltage for the motor and means responsive to the energization of the motor field-magnet windings by such exciter generator for actuating the connecting means and for rendering the low-voltage means inoperative.

7. The combination with a synchronous motor provided with a field-magnet winding and an armature winding, of a direct-connected exciter generator, means normally connecting the motor field-magnet winding to the exciter during the starting period of the motor, means for applying starting and normal operating voltages to the motor armature winding, and means in circuit with the motor field-magnet winding for controlling the voltage-applying means, said controlling means being non-responsive to the alternating forces induced in the field-magnet winding by transformer action from the armature winding and responsive to a predetermined value of direct current caused to traverse the field magnet winding by the exciter generator.

8. The combination with a synchronous motor provided with a direct-connected exciter generator normally connected to excite the field-magnet winding of the motor, a source of electromotive force, a circuit interrupter for connecting the motor armature windings directly thereto, and a plurality of circuit interrupters for also connecting said armature windings thereto through a plurality of transformers to provide a reduced voltage for starting the motor, said interrupters being so interlocked that said armature windings must be first connected to the source of electromotive force through the transformers, of means responsive to the energization of the motor field-magnet winding by the exciter generator for actuating the first-mentioned interrupter and for simultaneously tripping the starting interrupters.

9. In a system for starting a synchronous motor provided with a direct-connected exciter generator normally connected to excite the field-magnet winding of the motor, the combination with an interrupter for connecting the armature windings of the motor directly to an electric circuit and a plurality of interrupters for connecting said armature windings to the circuit through a plurality of transformers, of means for so interlocking the interrupters that the first-mentioned interrupter may be actuated only after the plurality of interrupters have been actuated to connect said armature windings to the circuit through the transformers, and means responsive to the energization of the motor field-magnet windings by said exciter generator at synchronous speed for actuating the direct-connecting interrupter.

10. The method of starting a synchronous motor provided with a direct-connected exciter generator normally connected to the field-magnet winding of the motor to energize the same, which consists in connecting the armature windings of the motor to a source of reduced voltage and thereafter connecting said armature windings to the normal operating voltage when the motor field-magnet winding is energized with direct current of a predetermined value from the exciter generator and at a predetermined motor speed.

11. The method of starting a synchronous motor provided with a direct-connected exciter generator normally connected to energize the field-magnet winding of the motor, which consists in connecting the armature windings of the motor to a source of reduced voltage and thereafter connecting said armature windings to the normal operating voltage at a predetermined value of the direct current in the motor field-magnet winding corresponding to a predetermined motor speed.

12. In a system for starting a synchronous motor provided with a direct-connected exciter generator normally connected in circuit with the field-magnet winding of the motor, the combination with a source of reduced electromotive force, a source of electromotive force of normal operating value and means for connecting the armature windings of the motor thereto, of means for automatically effecting the connection of said armature windings to the source of reduced electromotive force, and means connected in circuit with the motor field-magnet winding and actuated after the motor attains synchronous speed for automatically effecting the disconnection of said armature windings from the source of reduced electromotive force and for subsequently effecting the connection of said armature windings to the source of electromotive force of normal operating value.

13. The combination with a synchronous motor provided with an armature winding, a field-magnet winding and a direct-connected exciter normally connected to said field-magnet winding, of means for consecutively applying starting and normal voltages to the motor armature winding and a single means depending upon the motor attaining synchronous speed and the current supplied to the motor field-magnet winding by the exciter being at least a predetermined minimum value, for controlling the voltage-applying means.

14. In combination, a source of alternating current, an alternating-current dynamo-electric machine having an armature winding and field winding, switching means arranged to connect said armature winding to said source whereby a low voltage is impressed thereon, switching means arranged to connect said armature winding to said source whereby a high voltage is impressed thereon, means adapted, when operated, to effect the operation of said first mentioned switching means, means arranged to supply direct current to said field winding after the operation of said first mentioned switching means, and means responsive to the current through said field winding to effect the operation of said second mentioned switching means.

15. In combination, a source of alternating current, an alternating-current dynamo-electric machine having an armature winding and a field winding, switching means arranged to connect said armature winding to said source whereby a low voltage is impressed thereon, switching means arranged to connect said armature winding to said source whereby a high voltage is impressed thereon, means adapted, when operated, to effect the operation of said first mentioned switching means, means arranged to supply direct current to said field winding after the operation of said first mentioned switching means, and means responsive to a predetermined amount of direct current through said field winding to effect the operation of said first mentioned switching means to disconnect said armature winding from said source and the operation of said second mentioned switching means to connect said armature winding to said source.

In testimony whereof, I have hereunto subscribed my name this 24th day of May, 1920.

CLARENCE A. JOHNSON.